(12) United States Patent
Obermeyer

(10) Patent No.: US 8,262,315 B2
(45) Date of Patent: Sep. 11, 2012

(54) HYDROELECTRIC GENERATING STATION AND METHOD OF CONSTRUCTING SAME

(76) Inventor: Henry Karl Obermeyer, Wellington, CO (US)

( * ) Notice: Subject to any disclaimer, the term of this patent is extended or adjusted under 35 U.S.C. 154(b) by 661 days.

(21) Appl. No.: 11/986,584

(22) Filed: Nov. 21, 2007

(65) Prior Publication Data

US 2008/0143116 A1 Jun. 19, 2008

Related U.S. Application Data

(60) Provisional application No. 60/860,802, filed on Nov. 22, 2006.

(51) Int. Cl.
*E02B 9/00* (2006.01)
(52) U.S. Cl. .............. 405/78; 405/75; 290/54
(58) Field of Classification Search ............ 405/75, 405/76, 77, 78; 290/42, 43, 53, 54
See application file for complete search history.

(56) References Cited

U.S. PATENT DOCUMENTS

| | | | | |
|---|---|---|---|---|
| 4,143,990 A | * | 3/1979 | Atencio | 405/78 |
| 4,345,159 A | * | 8/1982 | Gutierrez Atencio | 405/78 |
| 4,358,220 A | * | 11/1982 | Gutierrez Atencio | 405/75 |
| 4,476,396 A | * | 10/1984 | Calvert, Jr. | 405/78 |
| 4,955,789 A | * | 9/1990 | Chacour et al. | 290/43 |
| 4,998,846 A | * | 3/1991 | Evstratov et al. | 405/78 |
| 6,281,597 B1 | * | 8/2001 | Obermeyer et al. | 405/78 |
| 7,284,948 B2 | * | 10/2007 | Nichtawitz | 290/52 |
| 7,478,974 B1 | * | 1/2009 | Kelly | 405/78 |
| 2005/0002785 A1 | * | 1/2005 | Nichtawitz | 415/220 |

* cited by examiner

*Primary Examiner* — Frederick L Lagman

(57) ABSTRACT

The invention relates to hydroelectric generating plants which may be prefabricated and subsequently exchanged for preexisting radial water control gates. The hydroelectric generating plant disclosed herein may be particularly advantageous for hydroelectric development of projects with preexisting submergible radial gates. Various configurations are disclosed which maximize generating capacity, hydraulic efficiency, and flood flow capacity, while minimizing weight and cost.

12 Claims, 7 Drawing Sheets

EXISTING TAINTER GATE

SERVICE (REPAIR) POSITION

LOWERED POSITION

REPLACEMENT TURBINE ASSEMBLY

POWER GENERATING POSITION

HYDROELECTRIC GENERATING STATION AND METHOD OF CONSTRUCTING SAME

This application is based upon and claims the benefit of my Provisional application No. 60/860,802, Filed Nov. 22, 2006.

BACKGROUND OF THE INVENTION

1. Field of Invention

The present invention relates to hydroelectric generating facilities which may be constructed in conjunction with, or installed as a replacement for, radial water control gates. The hydroelectric generating apparatus disclosed herein may be particularly advantageous for generating power at submergible radial gates, examples of which were constructed at Meldahl Locks and Dam, New Cumberland Locks and Dam, Markland Lock and Dam, and McAlpine Lock and Dam on the Ohio River and Marseilles Lock and Dam on the Illinois River in the USA. The hydroelectric generating facilities and the methods of installation disclosed herein have many potential applications where preexisting gate structures can be converted into hydroelectric plants while avoiding the cofferdamming, dredging, excavation, geological and hydrological risk, and concrete construction associated with traditional hydroelectric generating plants. While a number of hydroelectric plants have been developed using technology as described in U.S. Pat. Nos. 4,755,690 and 4,804,855 to Obermeyer and U.S. Pat. No. 6,281,597 B1 to Obermeyer et al, and which also exploits existing water control structures; the herein disclosed hydroelectric generating art provides several additional advantages including, at certain projects, fuller utilization of all available head, greater power output per gate bay or module, and increased convenience of lifting and lowering the modules to switch between flood passage and hydroelectric power generation modes.

2. Description of Related Art

Various efforts have been made and ideas put forth to develop commercially viable prefabricated hydroelectric generating plants for installation at existing water control structures and which can be lifted above flood level so as to not impede flood flows and thus exacerbate upstream flooding. Some of the prior art apparatus has been designed to fit preexisting stop log slots associated with large scale water control gates as disclosed in U.S. Pat. No. 4,755,690 to Obermeyer, U.S. Pat. No. 4,804,855 to Obermeyer, and U.S. Pat. No. 6,281,597 B1 to Obermeyer et al. These prior art designs have required sill elevations below tailwater elevation in order to utilize all of the available head. Additionally, new large capacity cranes may be required in order to lift the apparatus for servicing and for passage of flood flows. U.S. Pat. No. 4,319,142 to Mayo et al discloses an apparatus which can utilize all of the head at certain preexisting structures, but which may be relatively heavy, large, expensive and possibly not able to be lifted above maximum flood elevation. U.S. Pat. Nos. 4,165,467 and 4,170,428 to Atencio discloses a radially movable turbine generator apparatus which may be too heavy to be supported by preexisting structures and which may have an excessive overall length. A generating assembly that replaces a radial gate should be of limited upstream-downstream dimension. It should not extend so far upstream that, when in its lowered position, it would interfere with or prevent placement of emergency shut-off bulkheads nor, when it is in its raised position, interfere with overhead structures. It should also not extend so far downstream (in its generating position) that, when raised, it would interfere with flood flows or be impacted by waterborne debris.

SUMMARY OF INVENTION

It is an object of this invention to provide a low-cost alternative to both conventional hydroelectric generating plants and hydroelectric generating plants that may be installed into upstream stop log slots. It is a further object to provide a hydroelectric generating installation which may utilize the full available head at preexisting gate structures while not requiring a high capacity service crane for lifting the equipment prior to flood passage.

A further object of this invention may be to provide simple easy-to-install hydroelectric generating plants (or modules) which may installed in the place of preexisting radial gates, thereafter serving both the water control purpose of the preexisting radial gates and, when water passage requirements and water elevations permit, serving to efficiently and economically generate hydroelectric power.

Yet another object of this invention may be to provide a sufficiently lightweight generating plant that preexisting piers or abutments, which formerly supported or were designed to support, a radial gate, may be suitable to support the generating plant in the place of the radial gate.

Yet another object of this invention may be to provide a sufficiently lightweight generating plant that preexisting pivot connections at piers or abutments, which formerly supported a radial gate, may be suitable to support the generating plant.

Yet another object of this invention may be to provide a sufficiently lightweight generating plant that preexisting hoisting equipment at piers or abutments, which formerly supported a radial gate, may be suitable to support the generating plant.

A further object of one aspect of this invention is to provide a pivotably mounted generating plant which allows sufficient clearance to floodwater when in its raised position.

A further object of this invention may be to provide a pivotably mounted generating plant which allows clearance to floodwater when in its raised position equal to or greater than the clearance to flood water of the preexisting radial which the generating plant replaces.

A further object of one aspect of this invention is to provides transportable and modular hydroelectric generating plant which may installed in the place of preexisting radial gates, thereafter serving both the water control purpose of the preexisting radial gate and, when water passage requirements and water elevations permit, serving as an efficient hydroelectric generating plant, and further incorporating a trash screen on its water inlet face.

A further object of this invention is to provide a hydroelectric generating plant which may be lifted against a differential head, i.e., without a requirement that service bulkheads be installed prior to lifting.

A further object of this invention is to provide a hydroelectric generating plant which may be lifted against a differential head while causing to be lifted simultaneously a minimum weight of water trapped within the water passageways of the hydroelectric generating plant.

A further object of this invention is to provide a hydroelectric generating plant which may be lifted against a differential head while its water passageways are blocked near their inlet ends in order to lift simultaneously a minimum weight of water trapped within the water passageways of the hydroelectric generating plant.

A further object of this invention is to provide a hydroelectric generating plant which may be lifted against a differential head while its water passageways are blocked near their inlet ends and while air is admitted to the water passageways in order to lift simultaneously a minimum weight of water trapped within the water passageways of the hydroelectric generating plant.

A further object of this invention is to provide a hydroelectric generating plant which may be lifted against a differential head while its water passageways are blocked near their inlet ends and while air is admitted to the water passageways in order to lift simultaneously a minimum weight of water trapped within the water passageways of the hydroelectric generating plant and while also providing at the underside of the hydroelectric generating plant a structure resulting in minimum hydraulic down pull.

A further object of this invention is to provide a torsionally rigid generally tubular structure between radial support arms in conjunction with a plurality of generation associated water passageways.

A further object of this invention is to provide a torsionally rigid generally tubular structure between radial support arms located above (when in the lowered, generating position) a plurality of generation associated water passageways.

A further object of this invention is to provide a torsionally rigid structure between support arms that utilizes diagonal truss elements within the flow path upstream of the turbine generator units. Such diagonal truss elements within the discharge flow path are preferably streamlined in order to minimize impact on system efficiency.

A further object of this invention is to provide a torsionally rigid structure between support arms that utilizes diagonal truss elements within the flow path upstream of the turbine generator units in conjunction with curved plate structure enclosing at least a portion of the downstream face of the structure.

A further object of one aspect of on embodiment of the invention is to provide a torsionally rigid structure that incorporates diagonal truss elements within the discharge flow area of the structure. Such diagonal truss elements within the discharge flow path are preferably streamlined in order to minimize impact on system efficiency.

A further object of this invention is to provide a hydroelectric generating plant which incorporates a torsionally rigid generally tubular structure between radial support arms located below (when in the lowered, generating position) a plurality of generation associated water passageways.

A further object of this invention is to provide a hydroelectric generating plant which incorporates a torsionally rigid generally tubular structure between radial support arms through which pass a plurality of generation associated water passageways.

A further object of this invention is to provide a hydroelectric generating plant which incorporates a torsionally rigid generally tubular structure between radial support arms located above (when in the lowered, generating position) a plurality of generation associated water passageways wherein the tubular structure serves as spillway for water and/or debris.

A further object of this invention is to provide a hydroelectric generating plant which incorporates a torsionally rigid generally tubular structure between radial support arms located above (when in the lowered, generating position) a plurality of generation associated water passageways wherein the tubular structure serves as gated spillway for water and/or debris.

A further object of this invention is to provide a hydroelectric generating plant which incorporates a torsionally rigid generally tubular structure between radial support arms located above (when in the lowered, generating position) a plurality of generation associated water passageways wherein the tubular structure serves as pneumatically operated gated spillway for water and/or debris.

A further object of this invention is to provide a hydroelectric generating plant which incorporates a plurality of generation associated water passageways which extend below the sill elevation of the preexisting submersible gate which the hydroelectric generating plant replaces.

A further object of this invention is to provide a hydroelectric generating plant which incorporates a plurality of generation associated water passageways which extend below the sill elevation of the preexisting submersible gate which the hydroelectric generating plant replaces and into the tailwater.

A further object of this invention is to develop at a particular project the hydroelectric potential available from available submergible gate slots by the methods herein disclosed while relying on currently available power purchase rates, in conjunction with making regulatory provision for adding capacity with lesser rates of return at a future date when power purchase rates or other project benefits, such as $CO_2$ emissions displacement, justify capacity additions with a higher unit cost of generating capacity.

DETAILED DESCRIPTION OF THE PREFERRED EMBODIMENTS

Figure 1:
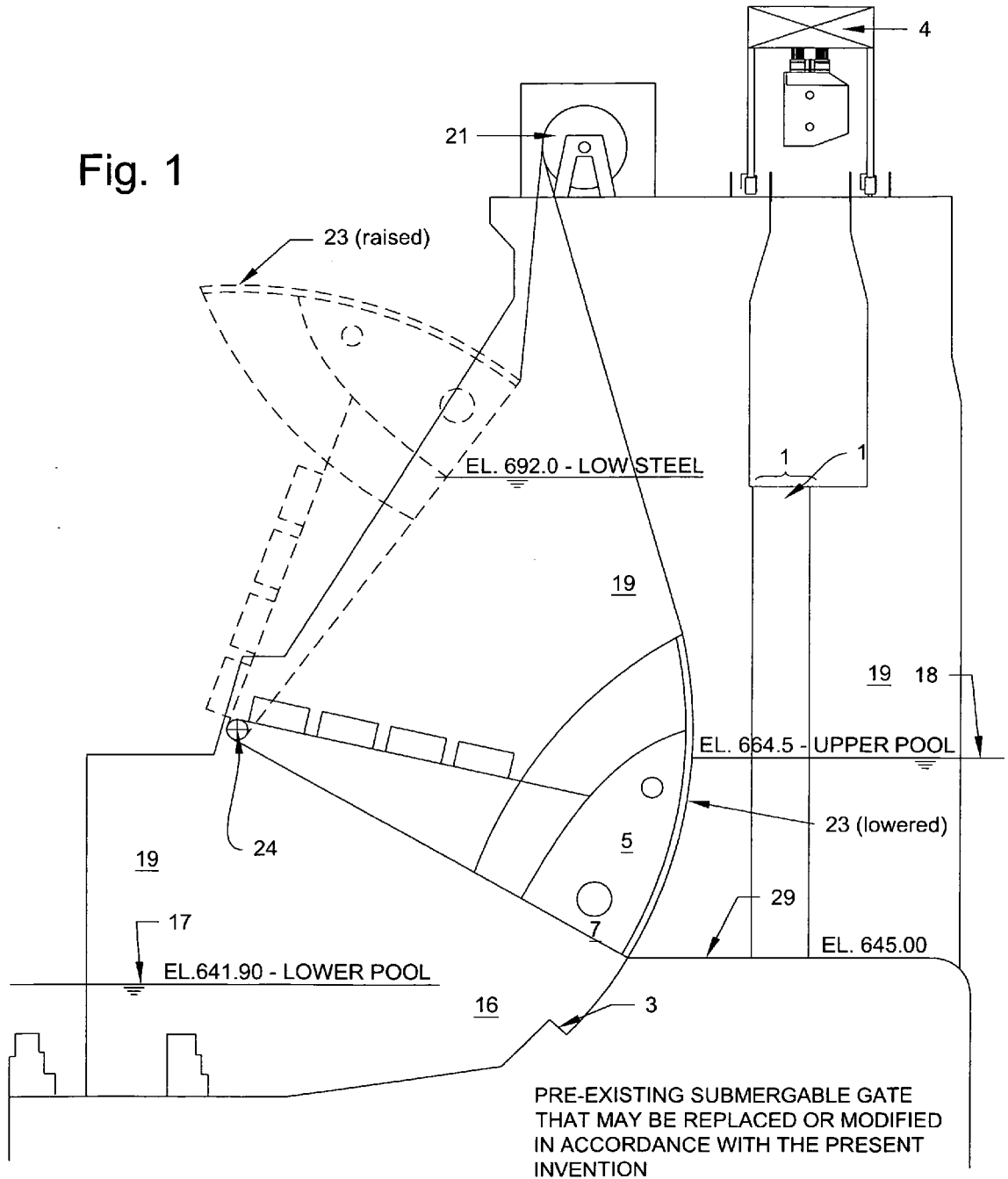
FIG. 1 is a sectional elevation drawing through submergible gate at New Cumberland Locks and Dam on the Ohio River, USA.

Referring to FIG. 1, a prior art pre-existing submergible radial gate 23 with gate pivots 24 at New Cumberland Locks and. Dam is shown in sectional elevation in both raised (dotted lines) and lowered (solid lines) positions. The gate sill 29 is at elevation 645 ft and is above the lower pool, or tailwater, elevation of 641.9 ft, making it impossible for a turbine generator array fitted to the stop-log slot 1 to utilize the full available head of 22.6 ft (upper pool elevation minus lower pool elevation). Radial gate 2 is was originally designed to be lowered to bottom gate stop 3 in order to pass ice and floating debris over the top of the radial gate 2. Dashed lines indicate the profile of gate 23 when fully lowered against stop 3. A further issue with utilizing the stop log slots 1 for generating modules 5 (in the figures that follow) is that the service bridge 4 limits the height to which a stop log slot installed generating module might be lifted above the specified "low steel" elevation of 692.0 ft. The radial gates are situated between piers 19 and are hoisted and lowered with gate hoists 21. Other similar radial gates are sometimes fitted with hydraulic cylinders for hoisting.

Figure 2A:
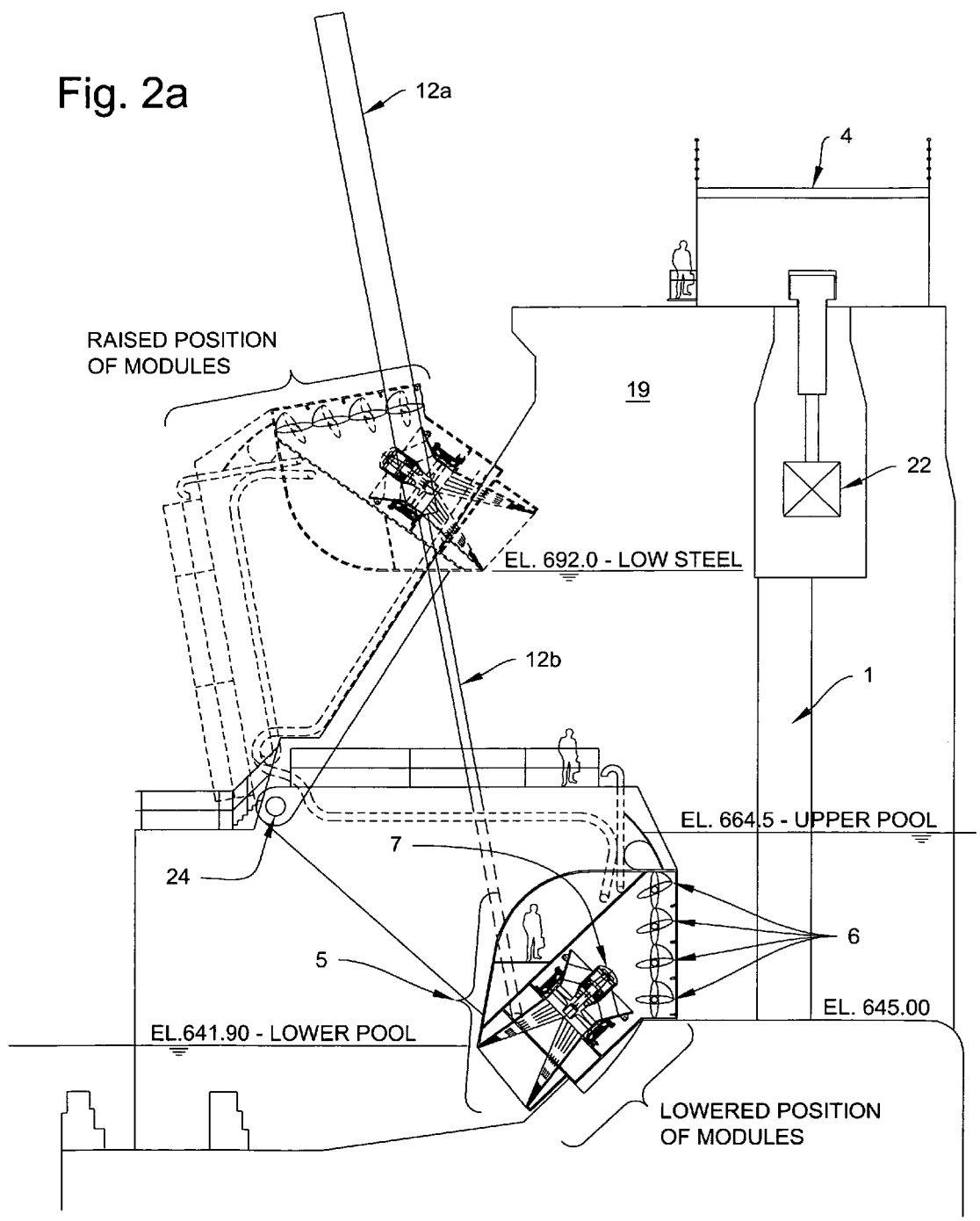
FIGS. 2a and 2b are sectional elevation drawings of a generating module in accordance with the present invention as it might be installed in a gate bay at New Cumberland Locks and Dam.
Figure 2B:
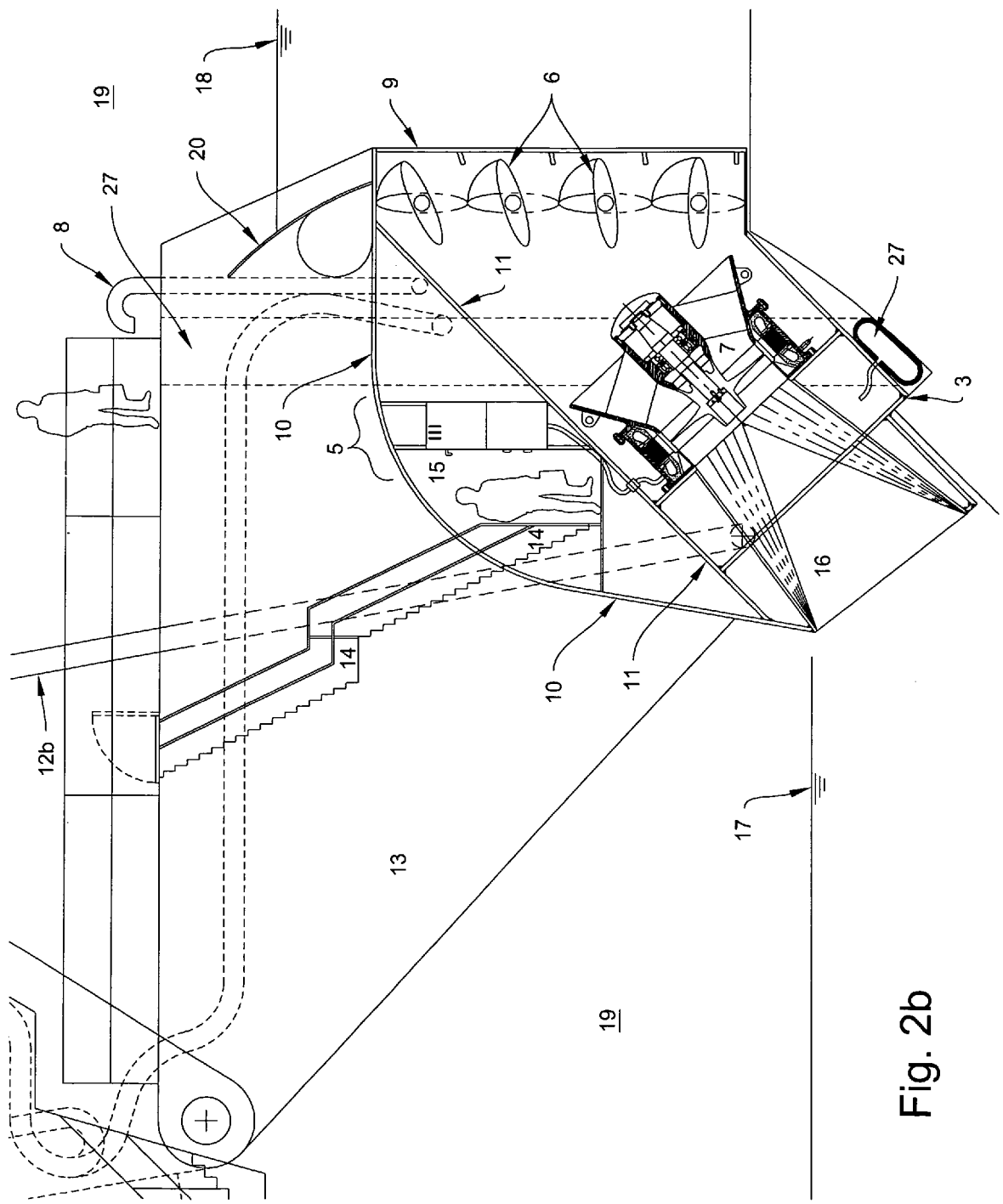

Referring to FIGS. 2a and 2b, a generating module 5 is shown in sectional elevation view in both raised and lowered positions between piers 19. The generating module 5 is raised and lowered as needed about pivot 24 by hydraulic cylinders 12a in conjunction with hydraulic cylinder rods 12b. Referring to FIG. 2b, wicket gates 6 may be used to open and close the flow passageway to the turbine-generators 7 and to shut off the water at a location which results in a minimal hydraulic forces resisting the raising of the module under differential head conditions. Vent pipes 8 allow air to fill the space formerly occupied by water during lifting operations and for air to escape from behind the wicket gates during lowering operations. Trash screen 9 prevents large debris from obstructing the wicket gates 6 or the turbine-generator sets 7. Downstream module surface 10 in combination with bulkhead and stiffener 11 together form a generally tubular structure that provides the module 5, as a whole, torsional rigidity about the horizontal axis normal to the direction of flow. Such torsional rigidity is required in order to minimize structural displacements due to hydraulic loads and debris impact and also to facilitate lifting of the module with hydraulic cylinder rods 12b located at each end of each generating module 5. Support arms 13 may be hollow to allow for a ship ladder 14 or other access means to switchgear hallway 15. Draft tube 16 extends into lower pool 17 in order to fully utilize the available head difference between upper pool 18 and lower pool 17. Wicket gates 6 may be connected by linkages to a common hydraulic cylinder for synchronized actuation. Turbine generator sets 7 may utilize rim generators, an example of which is disclosed in US patent application 2004219015, or may be other submersible turbine generator sets. Alternatively, bevel gear drives may be used to deliver power to one or more generators located outside of the water passageway such as in hallway 15 or its equivalent. Alternatively, a change in direction of the water passageway may be exploited to allow extension of the turbine shaft to a location outside of the water passageway where the generator or generators may be located.

Figure 3:
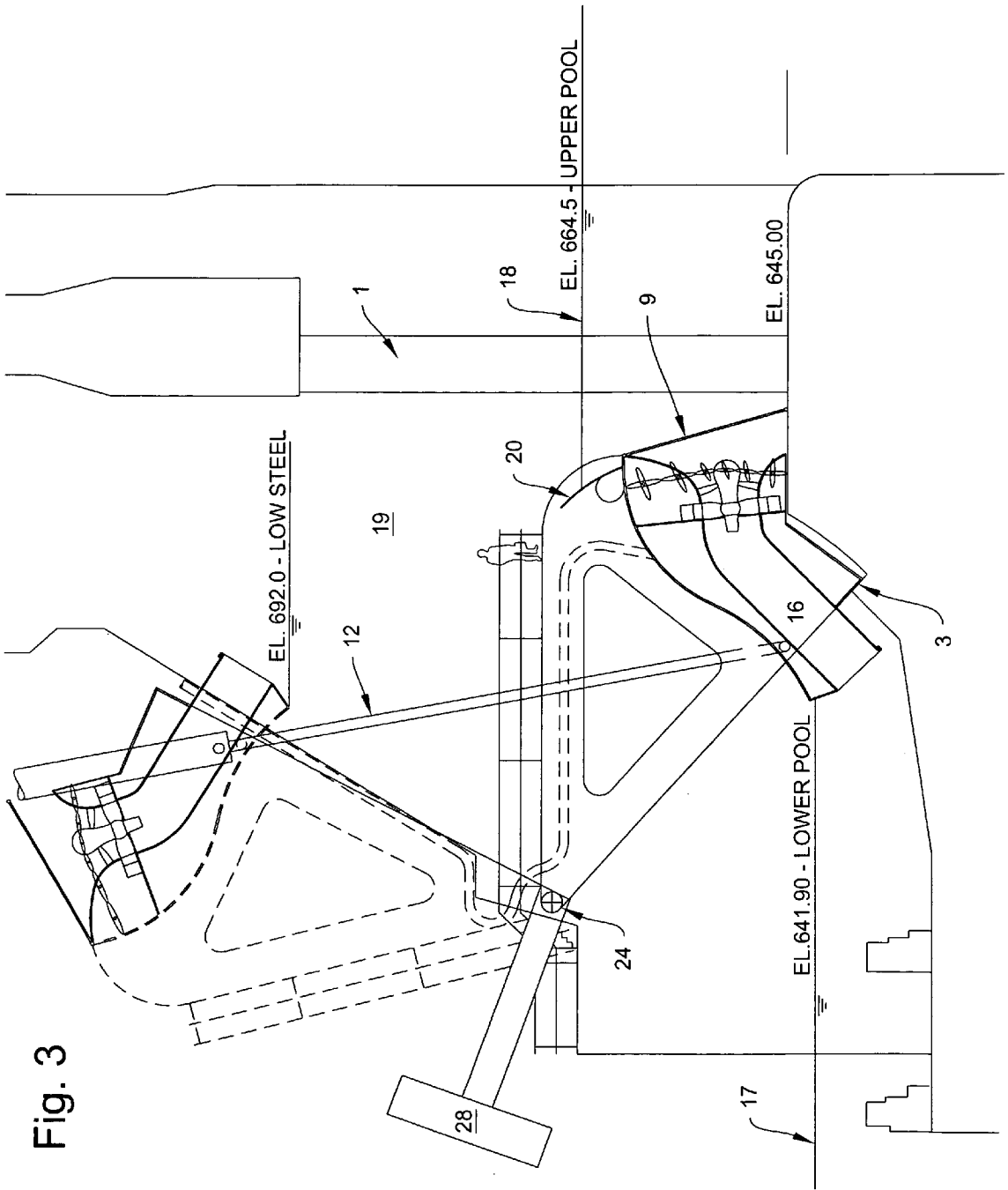
FIG. 3 is a sectional elevation view of one embodiment of the present invention, showing raised and lowered generating module positions.

Referring now to FIG. 3, a slightly different configuration is showing that allows for a longer draft tube 16. Counter weights 28 located downstream of pivots 24 and (in the horizontal and normal to flow direction) adjacent to the piers 19 at each end of the module 5 may be utilized in order to reduce hoisting loads. Spillway gates 20 provide the required upper portion of required damming height with minimal weight and also allow debris, ice, and excess flows to be discharged as needed.

Figure 4A:
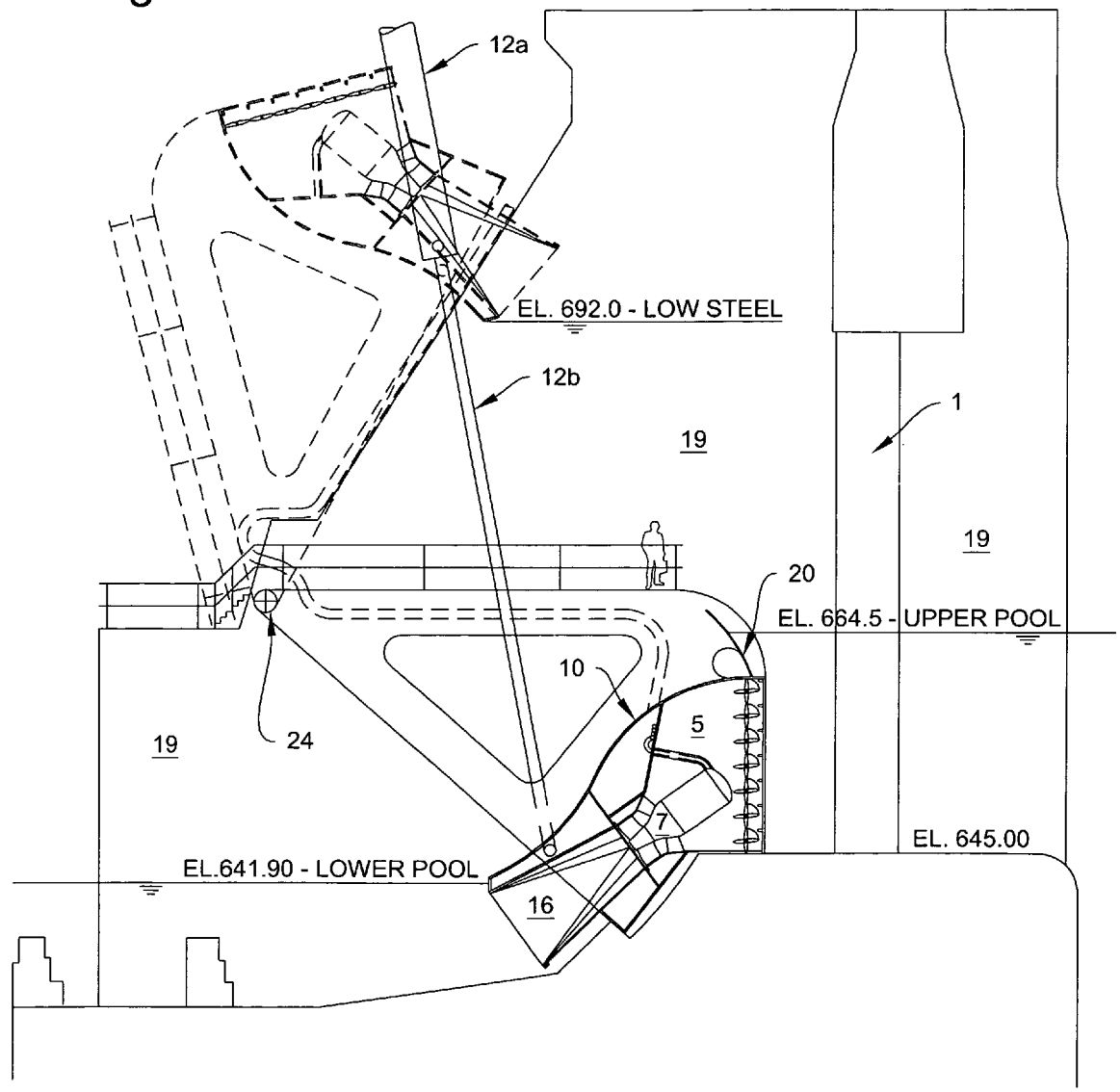
FIG. 4a is a sectional elevation view of one embodiment of the present invention showing raised and lowered generating module positions.
Figure 4B:
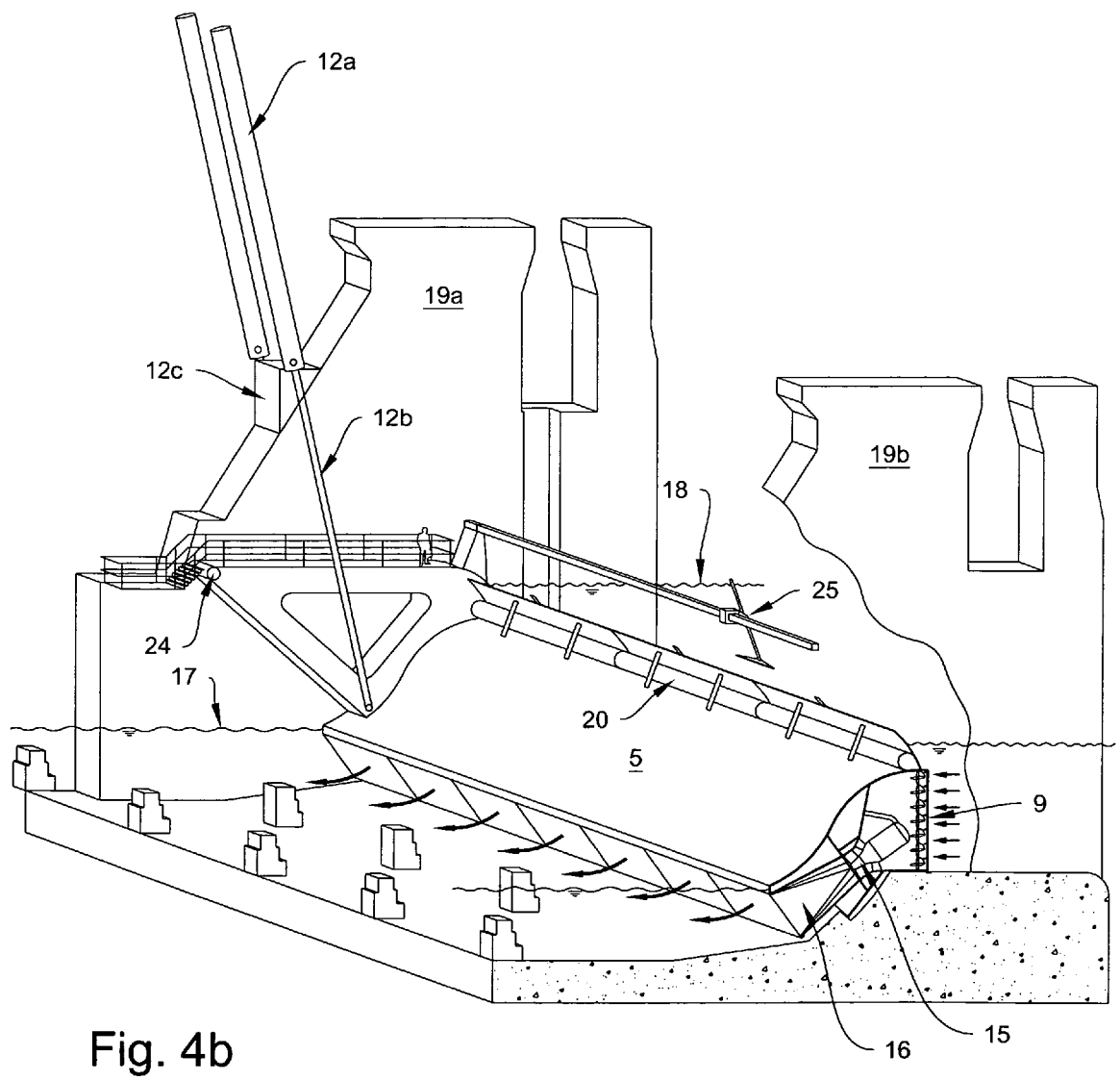
FIG. 4b is a cut-away perspective view of the generating module of FIG. 4a shown in the lowered, generating position.
Figure 5A:
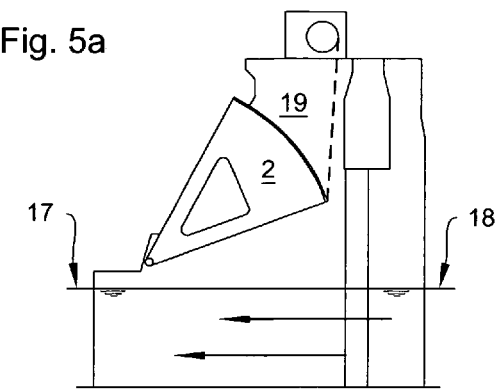
FIGS. 5a through 5f are comparative sectional elevation views of a radial gate and a generating module replacement for the radial gate.
Figure 5B:
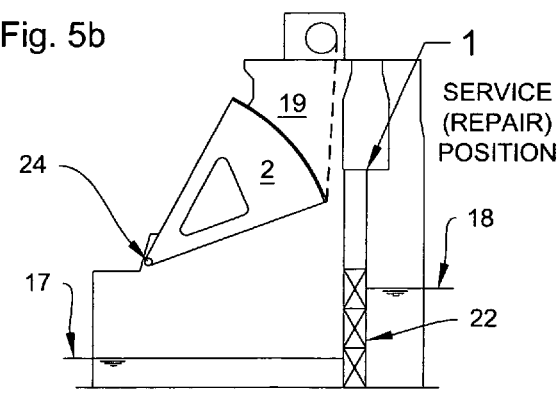
Figure 5C:
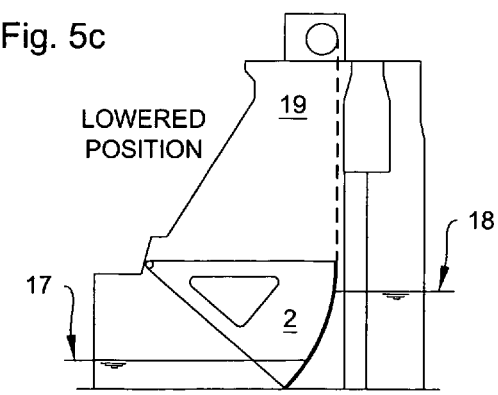
Figure 5D:
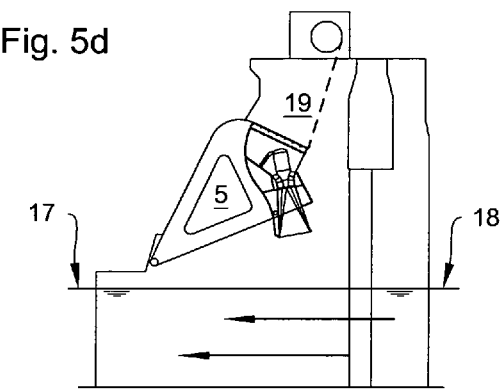
Figure 5E:
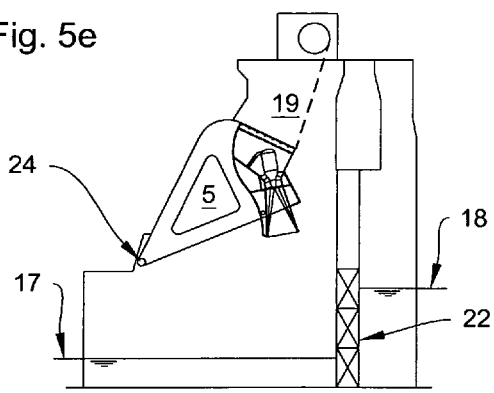
Figure 5F:
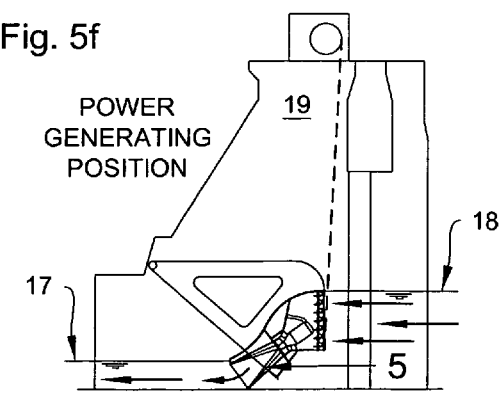

Referring now to FIGS. 4a and 4b, a generating module 5 is shown installed between piers (19 in FIGS. 4a and 19a and 19b in FIG. 4b). Hydraulic cylinders 12a (only one of which is shown in conjunction with module 5) are provided for lifting module 5 to its raised position for flood passage or servicing of turbine generator sets 7. Spillway gates 20 are provided for the purpose of passing floating debris over the module. Hydraulic cylinder mounting means 12c may be fitted to piers 19a and 19c in order to support hydraulic cylinders 12a which for many projects may be needed for lifting modules 5. Original gate hoisting equipment 21 may not be adequate for lifting modules 5 (which may be heavier than the original gates) to the required raised position. A trash rack rake 25 may be fitted directly to module 5.

Referring now to FIGS. 5a, 5b, 5c, 5d, 5e, and 5f, respectively, radial gate 2 is shown raised to pass flood flows, radial gate 2 is shown raised with service bulkheads 22 or stop logs in place, radial gate 2 is shown lowered against full head conditions, module 5 is shown raised during flood conditions, module 5 is shown raised to a service position with bulkheads 22 in place, and module 5 is shown in its generating position under full head. Upstream water levels 18 and downstream water levels 17 are indicated.

While submergible gates provide a highly effective and economical means of hydroelectric development as disclosed herein, they may exist at any one project an insufficient quantity of submergible radial gates for full exploitation of all of the hydroelectric potential of a site. In such cases, it is a further object of this invention to develop a project over time as economic conditions permit; by first installing that portion of new capacity with the best return on investment (likely the radial gate replacement in accordance with the present invention) in combination while providing for (with respect to FERC licensing, government agency negotiations, infrastructure improvements, power delivery contracting, financing and so forth) installation of additional capacity at a later date if and when economic thresholds are met. Such additional capacity might involve conventional construction, additional generating equipment replacing radial gates, or generating equipment installed into stop-log slots. The present invention allows for full head utilization at relatively low tailwater elevations. Such low tailwater elevations generally occur during low river flows. Under such conditions a hydroelectric generating station in accordance with the present invention may fully exploit the maximum head condition as well as all available flow. Such an installation used in conjunction with generating equipment (of prior art) installed in stop log slots (or in a conventional powerhouse) provides for effective year round utilization of available head arid flow.

As can be easily understood from the foregoing, the basic concepts of the present invention may be embodied in a variety of ways. It involves the hydroelectric facility installation techniques, the hydroelectric generating equipment itself, as well as the methods of operating such equipment and facilities. In this application, the hydroelectric generating techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims which will be included in a full patent application.

It should also be understood that a variety of changes may be made without departing from the essence of the invention. Such changes are also implicitly included in the description.

They still fall within the scope of this invention. A broad disclosure encompassing both the explicit embodiment(s) shown, the great variety of implicit alternative embodiments, and the broad methods or processes and the like are encompassed by this disclosure. The full patent application will seek examination of as broad a base of claims as deemed within the applicant's right and will be designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "means for installing" or a "installation" should be understood to encompass disclosure of the act of "installing"—whether explicitly discussed or not—and, conversely, were there effectively disclosure of the act of "generating", such a disclosure should be understood to encompass disclosure of a "generator" and even a "means for generating". Such changes and alternative terms are to be understood to be explicitly included in the description.

Patents, publications, or other references mentioned in this application for patent are hereby incorporated by reference. In addition, as to each term used it should be understood that unless its utilization in this application is inconsistent with such interpretation, both traditional and common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the generating devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the elements disclosed, xi) each potentially dependent claim or concept as a dependency on each and every one of the independent claims or concepts presented, and even implicit variations of each of these systems and methods, xii) those alternative designs which disclosed and described, xiii) the related methods disclosed and described, xiv) similar, accomplish each of the functions shown as are disclosed and described, xv) those alternative designs and methods which accomplish each of the functions shown as are implicit to accomplish that which is disclosed and described, xvi) each feature, component, and step shown as separate and independent inventions, and xvii) the various combinations and permutations of each of the above.

It should also be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is and will be used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

What is claimed is:

1. A method of constructing a hydroelectric generating plant comprising the step of substituting a hydromotive machine apparatus for a radial water control gate.

2. The method of claim 1, wherein the hydromotive machine apparatus is comprised of one or more rows of hydromotive machines.

3. The method of claim 1, wherein the hydromotive machine apparatus is comprised of one or more rows of axial flow hydromotive machines.

4. The method of claim 1, wherein the hydromotive machine apparatus is comprised of one or more rows of axial flow hydraulic turbines with rim generators.

5. The method of claim 1, wherein said generating plant further comprises support structure which includes a gate sill, and wherein the hydromotive machine apparatus further comprises draft tube means extending below the elevation of said gate sill.

6. The method claim 1, wherein the hydromotive machine apparatus includes a trash screen.

7. The method of claim 1, wherein the hydromotive machine apparatus includes a trash screen and a trash screen rake.

8. The method of claim 1, wherein said hydromotive machine apparatus includes one or more torsionally rigid trusses for resisting rotation of said apparatus about a horizontal axis normal to the direction of flow of a water stream.

9. The method of claim 1, wherein said gate comprises a submergible radial gate.

10. A method for converting a dam structure in a water stream to a hydroelectric generating plant, wherein said dam structure comprises a radial water control gate supported by a support structure; wherein the method comprises the steps of:
   a. removing said radial water control gate; and
   b. installing a hydroelectric generating module in said dam structure in place of said gate; wherein said module is capable of being selectively raised or lowered relative to the water level in said water stream.

11. A method in accordance with claim 10, wherein said module comprises a plurality of hydromotive machines in a torsionally rigid structure capable of resisting rotation thereof about a horizontal axis normal to the direction of flow of said water stream.

12. A method in accordance with claim 10, wherein said generating module comprises a submergible radial gate.

* * * * *